UNITED STATES PATENT OFFICE.

FRANCIS L. STEWART, OF MURRAYSVILLE, PENNSYLVANIA, ASSIGNOR OF ONE-HALF TO SAMUEL E. GILL, OF PITTSBURG, PENNSYLVANIA.

TREATMENT OF MAIZE FOR THE MANUFACTURE OF CELLULOSE PRODUCTS.

No. 811,524.  Specification of Letters Patent.  Patented Jan. 30, 1906.

Application filed March 31, 1905. Serial No. 253,138.

*To all whom it may concern:*

Be it known that I, FRANCIS L. STEWART, of Murraysville, Westmoreland county, Pennsylvania, have invented a new and useful Improvement in the Treatment of Maize for the Manufacture of Cellulose Products, of which the following is a full, clear, and exact description.

I have discovered that by a peculiar process of treatment described herein the Indian corn plant (maize) can be caused to produce pulp and cellulose in greatly-increased quantity and of much better quality than can be obtained from the plant in its normal and untreated condition. The treatment to which I subject the plant is the practical application of a discovery I have made that by preventing the development and ripening of the grain a peculiar and abnormal development of the stalk takes place, resulting in a largely-increased quantity of fiber and cellular tissue which is of improved quality and is available for use in the manufacture of products of pulp and cellulose. In the practice of my invention this abnormal stalk development may be secured by removing the ears from the stalk of the growing plant while the grain is yet immature, and not later than at the stage of growth when the grain is yet in the soft and milky condition, the effect of which is to greatly prolong the life of the plant, as much as from fifty to seventy-five days, during which the cellulose structure becomes much more fully developed than when the grain is allowed to ripen, making it available for the manufacture from it of pulp and cellulose products in much larger quantities than from the plant in its normal condition. The same result, but with the needless sacrifice of the immature grain, is accomplished by sterilizing the plant (maize) either by lopping off the panicles to the period of pollination or by a system of close planting—for example, the stalks standing three or four inches apart in the rows and the rows about three feet apart—so as to prevent the development of the ears or to make the plants abortive. This treatment is based upon my discovery of a principle or law of development in this plant (maize) by taking advantage of which and treating the growing plant in the specified manner and at the proper time profound functional changes are found to result, one of which is an increase in the quantity and an improvement in the quality of the cellular matter and fiber in the stalk. This development sets in immediately after the removal of the immature ear from the stalk or after sterilization has been performed at the proper time, and it must be allowed to continue for a period of from thirty to seventy-five days, during which it is regularly progressive and the condition of the plant becomes greatly modified, there being a great increase in the soluble carbohydrates as well as the cellulose. By the discovery of the governing principle in this plant which determines these changes and by treating the growing plant in the manner prescribed complete control is secured in causing this development and the results are constant. When treated as above described, there is but little accumulation of silicious matter upon or within the outer shell or coating of the stalk, which accumulation, if it occurred, would tend to solidify and cement together a large proportion of the fibers. The whole structure of the stalk is therefore softer and of more open texture than in the case of stalks grown in the ordinary way. The relatively small portion of silicious matter facilitates the cleansing of the material from soluble impurities by washing and pressure and renders the after working of the fiber easy. It also affords uniformity in the composition of the pulp product because the fiber and cellular tissue enter into it in about the proper proportion to form good paper. In all these respects the stalks which have been treated in accordance with my invention are in marked contrast to stalks which have been grown in the ordinary way.

The treatment above described gives the plant an entirely new value, rendering it available for all the uses for which pulp may be employed, as in the manufacture of paper, the manufacture of the higher grade of cellulose, and the production of pyroxylin, smokeless powder, celluloid, collodion, viscose, &c.

After the plant has been treated as above described, and preferably when it has attained the limit of its subsequent growth, I cut it and reduce it to pulp or treat it otherwise in the manner usual in the manufacture of cellulose products, in which treatment the qualities above described render it peculiarly desirable.

I claim—

1. The method herein described which consists in growing stalks of maize and preventing the formation of ripened ears thereon, continuing the growth of the stalks beyond the normal period of pollination, and thereby causing a largely-increased development of the cellular structure, then cutting the stalk and treating it for the production of cellulose products.

2. The method herein described which consists in sterilizing the stalks of maize, continuing the growth after such sterilization and thereby causing a largely-increased development of the cellular structure, then cutting the stalk and treating it for the production of cellulose products.

3. The method herein described which consists in planting maize so that the stalks will be in close proximity, sterilizing the stalks, continuing the growth after such sterilization, and thereby causing a largely-increased development of the cellular structure, then cutting the stalk and treating it for the production of cellulose products.

In testimony whereof I have hereunto set my hand March 27, 1905.

FRANCIS L. STEWART.

Witnesses:
THOMAS W. BAKEWELL,
H. M. CORWIN.